Feb. 4, 1958 W. F. BILLINGSLEY 2,822,219
WHEEL, TIRE AND TRIM RING ASSEMBLY
Filed Nov. 4, 1955
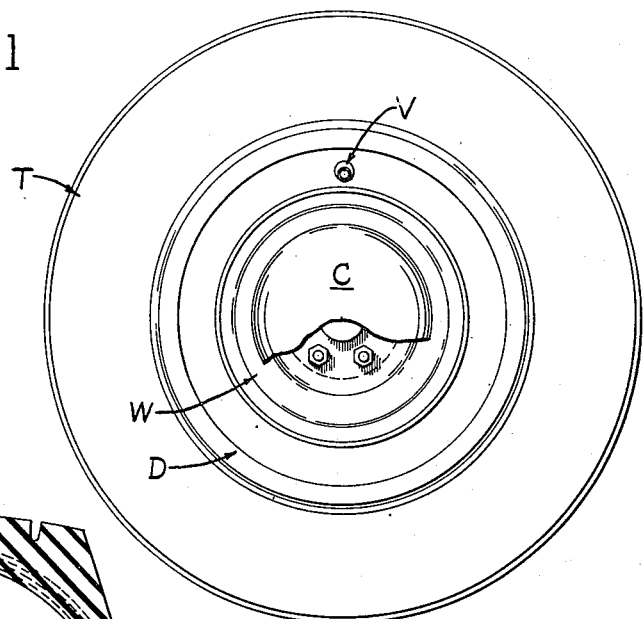
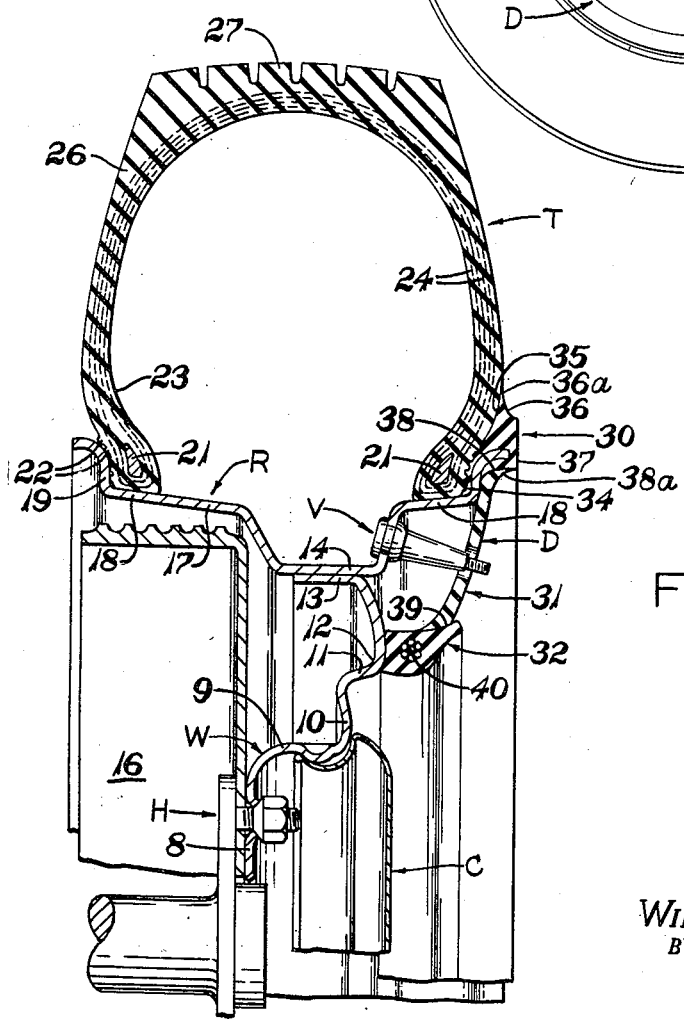
INVENTOR.
WILLIAM F. BILLINGSLEY
BY
C. E. Tripp
ATTY.

United States Patent Office 2,822,219
Patented Feb. 4, 1958

2,822,219
WHEEL, TIRE, AND TRIM RING ASSEMBLY

William F. Billingsley, Silver Lake, Ohio, assignor to The B. F. Goodrich Company, New York, N. Y., a corporation of New York Application November 4, 1955, Serial No. 544,892

4 Claims. (Cl. 301—37)

This invention relates to a combined wheel, pneumatic tire and trim ring assembly. There is a trend in automobile design and styling toward the production of cars that are low, and since there are practical limitations to this trend automobile designers are ever seeking for means to augment the low appearance of the vehicle without going to extremes in space limitations and chassis design. This trend has been accompanied by a trend toward smaller diameter wheels and tires but here, too, there are limitations relating to ride, stability and braking power which make it undesirable to reduce wheel, rim and tire diameters below certain dimensions for a vehicle of a given size. Tires are almost always provided with circumferential ribs, on at least the outer side of the sidewall which have some function as curb guards and enhance the appearance of the tire. These ribs are customarily disposed a substantial radial distance away from the tire beads and are sometimes referred to as "buffing ribs" wherein the sidewall portion of the tire radially inside of the rib is white, because the junction of the white (or other color rubber) and the black rubber can be delineated at one side of the rib. It is a feature of this invention that advantage is taken of the fact that motorists are accustomed to the appearance of a wheel and tire assembly wherein there is a circumferential rib on the tire sidewall intermediate the rim flange and the tire tread to provide a wheel, tire and ornamental trim ring assembly that gives the appearance of a large section tire mounted on a small diameter wheel thereby improving the low appearance and styling of the vehicle. In one embodiment of the invention this advantage is attained by disposing the circumferential tire rib close to the tire bead so that radially inner edge of the tire rib fits against the periphery of the outer rim flange. An ornamental wheel trim ring is provided that extends from a zone adjacent the tire rib to a radially inner zone on the wheel and the inner portion of the trim ring bears a reinforcement that assists in holding the trim ring in place and simulates a rim flange, the result being an assembly having the appearance of a large section tire mounted on a small diameter wheel.

There has also been a trend toward white sidewall tires, particularly as original equipment on new cars. The white sidewall (or other colored) portion is customarily that part of the tire sidewall disposed radially inwardly of the rib, which rib usually serves as a buffing rib and must be partially ground or abraded (buffed) away to eliminate white and black rubber overlap in order to provide clean delineation of colors. With this invention, if a white sidewall (or other colored sidewall) effect is desired the trim ring need only be made of white rubber (for example) and the desired effect is attained. This gives three advantages. First, the tire sidewall is made of all black rubber; second, the rib need not be buffed; and third, the tire rim and rim edge act as a positive guard or curb deflector to prevent marring or cutting the white trim ring. This last feature eliminates one of the problems encountered by motorists using conventional white sidewall tires. Not only is the white sidewall easily marked, but is made of a rubber having less resistance to damage than carbon black rubber, and is disposed on the tire so as to be vulnerable to damage from curbs and the like. Should the white trim ring of this invention be damaged it can be replaced at a relatively low cost, but if the white sidewall of a tire is damaged, the cost of repair or replacement is usually prohibitive.

Finally, certain white sidewall tires commonly manufactured are not as sturdy as a tire with black sidewalls because they are formed of zinc oxide reinforced natural rubber or GRS as explained in the patent to Gray 2,679,277, assigned to The B. F. Goodrich Company, such white sidewalls are prone to crack in use because of the constant flexing of the tire sidewall. This invention gives the advantages of the white sidewall tire from the standpoint of appearance, without the physical and structural disadvantages and without requiring the use of more expensive synthetic rubbers in the sidewall.

According to this invention a wheel, tire and ornamental trim ring assembly is provided that gives the appearance of a relatively large section tire mounted on a relatively small diameter wheel and the invention is very useful in assemblies where the effect of a white sidewall tire is desired. This invention is related to my copending application S. N. 544,891, filed November 4, 1955, assigned to The B. F. Goodrich Company but differs therefrom in an important respect in that in my aforesaid related application, a specially formed tire and rim are employed whereas in this application quite similar results are attained with a conventional tire and rim assembled with trim ring constructed and retained as will be described briefly.

As claimed broadly in my aforesaid related application the trim ring is curved inwardly from a zone adjacent a circumferential rib to the wheel, and the visible portion of the tire has a complementary curve toward the tread, the two curves cooperating to form a convex curve interrupted at its apex by the circumferential rib. In this invention the apex rib is not formed on the tire sidewall but is formed at the radially outer portion of the trim ring. The radially outer portion of the trim ring is actually channeled to receive the rim flange, the axially inner flange forming one side of the channel being disposed between the rim flange and the side of the tire bead for retention. Other features of the invention can best be described in connection with the drawings in which:

Fig. 1 is a side view of the assembly, and
Fig. 2 is a section taken on 2—2 of Fig. 1.

The major elements of the assembly are the wheel W with its hub cap C, the rim R attached to the wheel but not visible from the outside, the tire T and the trim ring or wheel disc D.

The wheel W is mounted on the usual hub by means of bolts passing through the central radial flange 8. The wheel body is dished axially outwardly, and in the wheel construction best suited for the invention the dished portion of the wheel has a conical flange portion 9 that receives the hub cap, a generally radial portion 10, another conical flange 11 terminating in a reversely curved bulge or rib portion 12. The wheel extends generally radially outwardly from bulge 12 to the rim mounting flange 13 to which the base 14 of the well of rim R is attached. The brake drum 16 is mounted on the hub H in the usual manner and nests within the conical side 17 of the rim well. The rim has the usual spaced tire bead seats 18 terminating in tire retaining side flanges 19.

The tire T is of the usual bellied toroidal form and has the usual beads 21 and the tire is provided with sealing ribs 22 and an air impervious liner 23 if of the tubeless type. The carcass 24 is made up of the usual plies 24 of cord material 24 extending from bead to bead. The tire sidewall 26 and the tread 27 are both composed of wear resistant carbon black reinforced rubber sometimes referred to as "tread stock."

In the embodiment illustrated, the trim ring or wheel disc D is made of three pieces of rubber joined in a mold if the assembly is to simulate a large section white sidewall tire. These pieces are the outer channeled portion 30 formed of carbon black reinforced rubber, the central disc-like curved portion 31 formed of white (or other colors) pigmented rubber, and the inner portion 32 that is formed of carbon black reinforced rubber or of rubber of a color other than black and presses against bulge 12 of the wheel.

Describing the trim ring portions in more detail, the outer portion 30 is formed to provide a rim flange receiving channel 33 bounded on the axially inner side by retaining flange 34 that is compressed between the rim flange and tire bead. The portion 30 extends radially outwardly past the rim flange and is formed with a concave surface 35 to match the tire sidewall, there being an outer intersecting concave surface 36 that cooperates with surface 35 to provide a lip 36a that fairs the trim ring to the tire sidewall. The rib 37 has a generally radial substantially flat axially outer surface extending from the concave fairing surface 36 to the inner margin of portion 30 which is joined at the line 38 to the central white (for example) pigmented disc-like portion 31. Disc-like portion 31 is faired to the rib 37 as at 38a and is joined in the mold to inner portion 32 at line 39.

Inner portion 32 has a thickened body 39 reinforced with annular tension elements 40 such as bead wires and has a concave surface 41 to fit bulge 12 of the wheel. A flange 42 extends outwardly from the body, which in conjunction with the rounded body contour simulates a rim side flange. If carbon black reinforced rubber is employed a black rim will be simulated, but since this portion is reinforced by wires 40 or the like, adequate strength is obtained if pigmented rubbers of other colors are employed, and if it is desired to have the sidewall portion 31 match the wheel color, both portions 31 and 32 may be molded of one piece of rubber having the desired pigmentation.

The trim ring is molded with the inner portion 32 displaced axially from the outer portion by a somewhat greater distance than that shown in the assembly of Fig. 2 in order to augment the contact pressure between the portion 32 and the wheel bulge 12. The outer portion 30 may, in its relaxed position have a slightly smaller circumference than the rim flange so that a slight stretching is required when the ring is assembled around the rim flange.

When the tire is inflated, if it is a tubeless tire the sealing ribs 22 sink into flange 34 as seen in Fig. 2, but the flange itself is molded with a smooth surface.

The rib 37, backed up by the rim flange, acts as a guard to protect the vulnerable and readily easily marred white or colored trim ring portion 31, and the tire itself can have both sidewalls formed of relatively strong, crack resistant carbon black rubber yet the appearance of the assembly is that of a large section white (or other colored) sidewall tire. The white or colored rubber part 31 is not flexed in use as is a tire sidewall and hence can be made of relatively economical material such as zinc oxide reinforced rubber without danger of cracking in use.

Having completed a detailed description of the invention, I claim:

1. In combination, a vehicle wheel, tire and ornamental trim ring assembly, said wheel having a central attachment portion, an axially outwardly dished radially outer portion, a rim attached to said outer portion and having side tire retaining flanges, a pneumatic tire having beads seated on said rim, sidewalls, and a tread bridging said sidewalls, a trim ring comprising a flexible convex disc-like portion joining a channeled radially outer portion embracing the outer rim side flange, said channeled portion including a radially inwardly extending mounting flange gripped between the outer tire bead and outer rim side flange, an annular rib portion joining said mounting flange and disc portion and having a generally flat, axially outer face, said disc-like portion being convexly curved and extending radially and axially inwardly from the rib portion of said trim ring, said trim ring having a thickened inner body portion resiliently pressing against the axially outwardly dished portion of said wheel, said thickened body portion being externally rounded and merging with a flange diverging outwardly from the trim ring at the juncture of the disc-like and inner portions.

2. A trim ring for use in an ornamental assembly with a vehicle wheel and tire for giving the appearance of a large section tire mounted on a relatively small diameter wheel, said trim ring comprising a flexible convex disc-like portion that joins a channeled radially outer portion adapted to embrace an outer wheel rim side flange, the outer portion of said trim ring being formed with an annular axially projecting rib portion to serve as a curb guard, said trim ring also having a reinforced and thickened inner portion for resiliently pressing against said wheel, said inner portion being formed with a curved outer face terminating in a rib to simulate a side trim flange.

3. The trim ring as defined in claim 2 wherein the trim ring is formed of rubber-like material.

4. The trim ring as defined in claim 3 wherein the inner portion of the trim ring is reinforced with a wire grommet.

References Cited in the file of this patent
UNITED STATES PATENTS
2,447,021   Lyon _____ Aug. 17, 1948